United States Patent [19]

Keppler et al.

[11] Patent Number: 5,031,474
[45] Date of Patent: Jul. 16, 1991

[54] INDUSTRIAL ROBOT

[75] Inventors: Rainer Keppler, Poxdorf; Roland Kolb, Hemhofen; Manfred Eberle, Erlangen, all of Fed. Rep. of Germany

[73] Assignee: Siemens Aktiengesellschaft, Berlin & Munich, Fed. Rep. of Germany

[21] Appl. No.: 411,524

[22] PCT Filed: Mar. 25, 1988

[86] PCT No.: PCT/EP88/00253

§ 371 Date: Sep. 29, 1989

§ 102(e) Date: Sep. 29, 1989

[87] PCT Pub. No.: WO88/07437

PCT Pub. Date: Oct. 6, 1988

[30] Foreign Application Priority Data

Mar. 31, 1987 [DE] Fed. Rep. of Germany ....... 3710687

[51] Int. Cl.$^5$ .................. B25J 11/00; B25J 17/00
[52] U.S. Cl. ........................ 74/479; 901/23; 901/28; 901/15
[58] Field of Search ............... 901/14, 15, 21, 23, 901/24, 25, 28; 310/52, 58, 59, 62, 63; 74/479

[56] References Cited

U.S. PATENT DOCUMENTS

| | | |
|---|---|---|
| 3,250,926 | 5/1966 | O'Reilly et al. ............... 310/60 R |
| 4,465,948 | 9/1984 | Oyama et al. ............... 310/58 X |
| 4,510,409 | 4/1985 | Kanayama ................ 310/60 R |
| 4,518,308 | 5/1985 | Grzybowski ................ 414/735 |
| 4,689,507 | 8/1987 | Baker et al. ................ 310/58 X |
| 4,690,010 | 9/1987 | Matsumoto et al. ........... 901/28 X |
| 4,725,191 | 2/1988 | Eberle et al. ................ 901/23 X |
| 4,742,257 | 5/1988 | Carpenter ................ 310/58 X |
| 4,900,959 | 2/1990 | Drinkut et al. ............. 310/60 A X |

FOREIGN PATENT DOCUMENTS

| | | |
|---|---|---|
| 0012237 | 6/1980 | European Pat. Off. . |
| 0169473 | 1/1986 | European Pat. Off. . |
| 0199146 | 10/1986 | European Pat. Off. . |
| 0203202 | 12/1986 | European Pat. Off. . |
| 3323976 | 9/1984 | Fed. Rep. of Germany ... 901/15 X |
| 2590197 | 5/1987 | France . |
| 2145055 | 3/1985 | United Kingdom ............. 901/15 X |

OTHER PUBLICATIONS

"Montageroboter mit modular afgebauten Achsen", pp. 709–710, in: Werkstattstechnik, Zeitschrift fur Industrielle Fertigung, vol. 74, No. 12, Springer-Verlag (Wurzburg, Germany) (Dec. 1984).

*Primary Examiner*—Allan D. Herrmann
*Assistant Examiner*—Khoi Q. Ta
*Attorney, Agent, or Firm*—Kenyon & Kenyon

[57] ABSTRACT

An assembly robot has rotational arm and a lifting axis and three rotational axes. A first rotary joint for defining the first rotational axis is mounted in a lateral projection of the lifting column. The assembly makes possible large pivoting angles.

2 Claims, 2 Drawing Sheets

INDUSTRIAL ROBOT

BACKGROUND OF THE INVENTION

The present invention relates to an industrial robot having at least one lifting axis a horizontally rotatable arm with two sections having three axes of rotation, and an individual drive unit for each axis of rotation.

Assembly lines now often use robots having a so called SCARA type of construction, such as is described in U.S Pat. No. 4,610,598. These are latively simple robots usually possess one lifting axis and three rotational axes.

SUMMARY OF THE INVENTION

The present invention relates to a simple and reliable industrial robot of the foregoing type. The industrial robot has a first rotary joint mounted on a lateral projection of a lifting column. A power unit, such as an electric moter drives the lifting column to provide vertical motion. The first rotary joint is a structural unit comprising a first motor, a first gear unit with an associated first bearing arrangement and a first coupling flange. The first motor and first coupling flange can be aligned substantially along a first axis of rotation defined by the first rotary joint.

A horizontally swinging arm comprises articulated first and second sections. The first section is removably mounted on the coupling flange of the first rotary joint. A second rotary joint joins the first and second sections together. The second rotary joint preferably comprises a second gear unit and a second bearing arrangement and defines a second axis of rotation. The second rotary joint is coupled to a second motor that is aligned with the first axis of rotation of the first rotary joint. A third rotary joint defining a third rotational axis can be arranged on the second section of the arm and coupled to a third motor that is mounted in the first section of the horizontally swinging arm.

DETAILED DESCRIPTION

Figure 1:
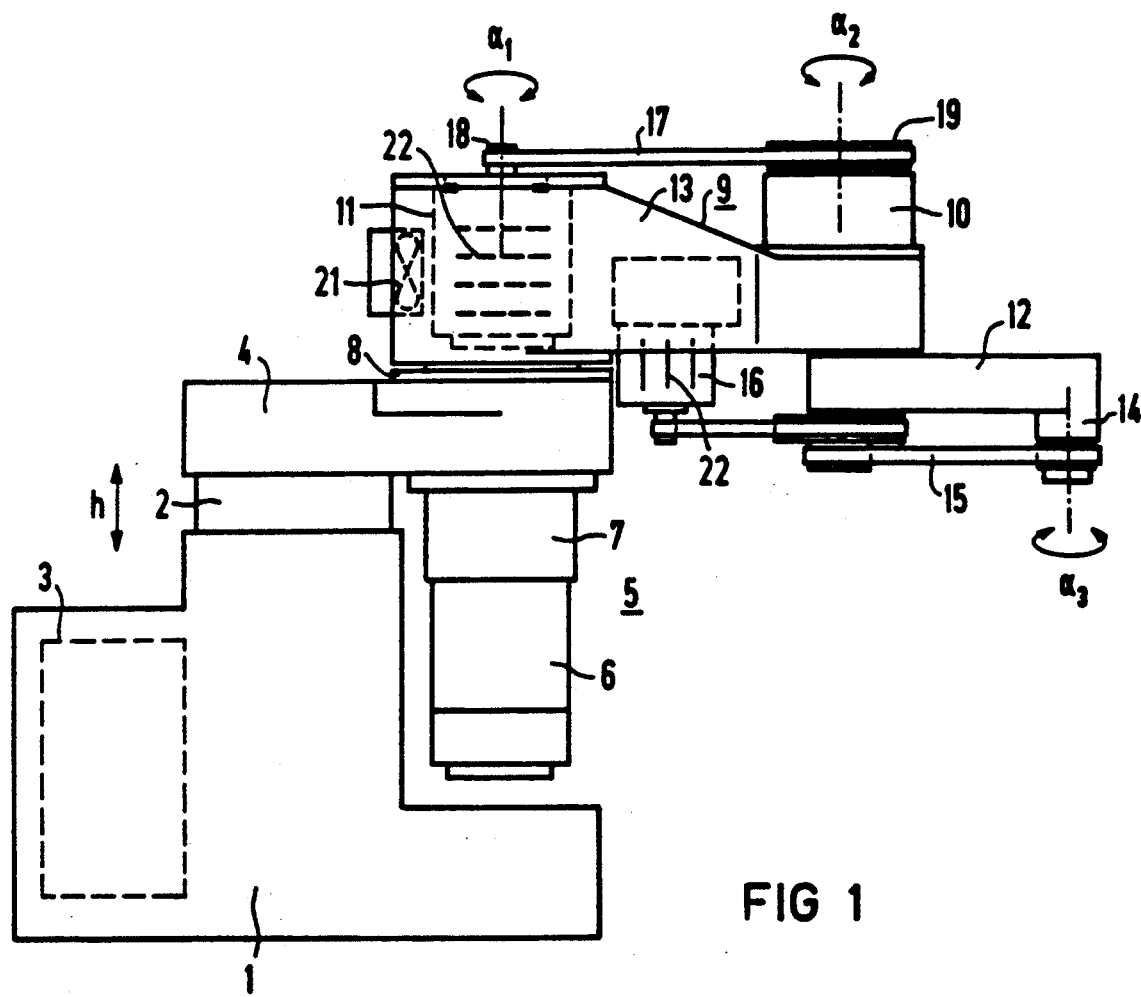
FIG. 1 shows the mechanical design of an industrial robot of the present invention.

FIG. 1 shows an industrial robot of the present invention that has a base 1 supporting a lifting column 2. The lifting column moves in the directions indicated by the double arrow h. An electric motor vertically by using known gears, racks, etc., that are not shown in FIG. 1.

Lifting column 2 has a lateral projection 4 on its upper end. A first rotary joint 5 is mounted as a structural unit to lateral projection 4. The structural unit is bolted together and is detachable. Rotary Joint 5 comprises a motor 6, a gear unit 7 and a coupling flange 8 so that a swinging motion is possible around a first rotational axis $a_1$. The gearing unit 7 is preferably designed as a planetary gear drive and advantageously has the feature of an extended planet carrier. Its bearing arrangement is simultaneously used to support rotary joint 5 on the lateral projection 4.

A horizontally swinging arm 9 is removably attached to the coupling flange 8. Horizontally swinging arm 9 comprises first and second arm sections 13 and 12, respectively, that can swivel in opposite directions around a second axis of rotation $a_2$. A second rotary joint 10 is formed on the second axis of rotation $a_2$ by a second gear unit that is supported in a way similar to first gear unit 7. An electric motor 11 drives second rotary joint 10. The axis of the electric motor 11 approximately coincides with the axis of motor 6. Motor 11 is accommodated in first section 13 and operates the gear unit of the second joint 10 through a toothed belt 17.

Figure 2:
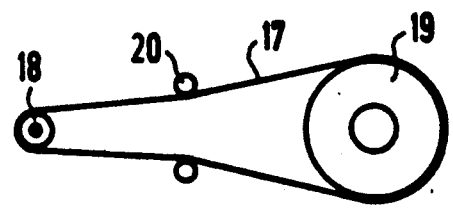
FIG. 2 shows the power transmission means for rotating the second section of the arm about the second rotational axis.
Figure 3:
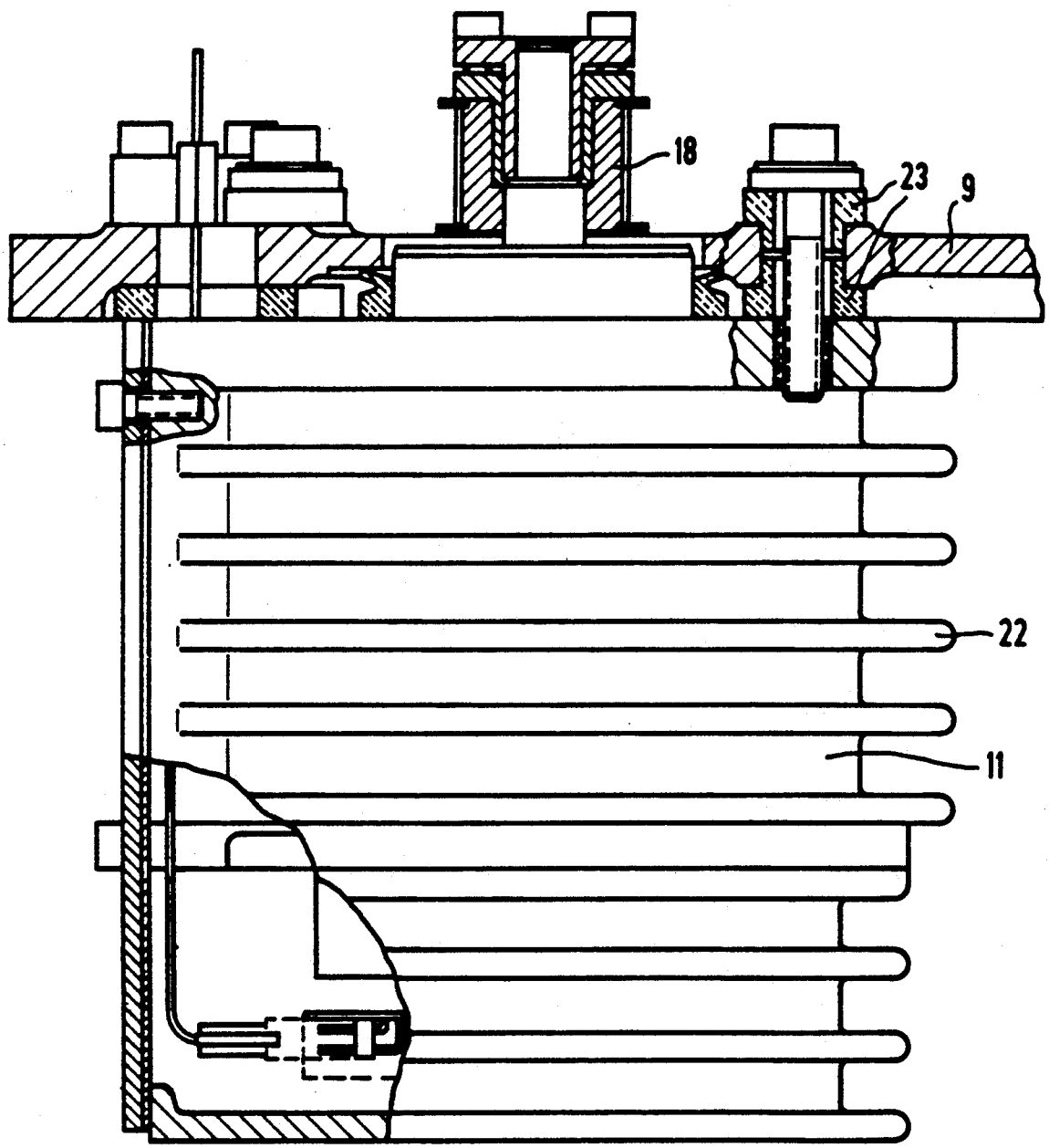
FIG. 3 shows a motor suspended in the horizontally swinging arm.

Referring to FIG. 2, two guide rollers 20 are provided for the toothed belt 17 between the output drive pinion 18 of the motor 11 and the driving pinion 19 of the gear unit. The guide rollers can define a grip angle for the toothed belt.

Rotation around a third axis of rotation $a_3$ is accomplished by driving third rotary joint 14 with an electric motor 16 by means of a toothed belt 15. Electric motor 16 is also arranged vertically in the first arm section 13. The foregoing mechanical design results in an assembly robot that has a sturdy and rugged construction. Another advantage is that the arm sections are designed to make large pivoting angles possible. For example, the centrically tapered.

The electric motors 11, 16 in the swinging arm section 13 can create undesirable excessive temperatures that can produce thermal expansions in the arm. The heating can affect accuracy since, for example, the actual arm length would no longer conform to the arm length assumed by the controller for the robot. This problem can be corrected providing flow-through ventilation in the arm. Cool air enters the arm in the region of the motor 16, flows over the cooling vanes 22 of both electric motors 16 and 11, and is exhausted by the fan 21. Both motors are suspended by heat insulation bushings 23 in the rotational arm.

What is claimed is:

1. An industrial robot, comprising:
    at least one lifting column having a lifting axis and a lateral projection extending transversely from the lifting axis;
    a first rotary joint mounted on the lateral projection, the first joint comprising a structural unit having first motor, a first gear unit, and a coupling flange, the first rotary joint defining a first axis of rotation, the first motor and first coupling flange being aligned along the first axis of rotation;
    a horizontally swinging arm comprising first and second sections, a first end of the first section being removably attached to the first rotary joint;
    a second rotary joint attached to a second end of the first section and a first end of the second section, the second rotary joint comprising a second gear unit, the second rotary joint defining a second axis of rotation;
    a second motor aligned along the first axis of rotation;
    means for coupling the second motor to the second rotary joint;
    a third rotary joint at a second end of the second section, the third rotary joint defining a third axis of rotation;
    a third motor;
    means for coupling the third motor to the third rotary joint; and
    means for ventilating air through the horizontally swinging arm to remove excess heat.

2. An industrial robot, comprising:

at least one lifting column having a lifting axis and a lateral projection extending transversely from the lifting axis:

a first rotary joint mounted on the lateral projection, the first joint comprising a structural unit having first motor, a first gear unit, and a coupling flange, the first rotary joint defining a first axis of rotation, the first motor and first coupling flange being aligned along the first axis of rotation;

a horizontally swinging arm comprising first and second sections, a first end of the first section being removably attached to the first rotary joint;

a second rotary joint attached to a second end of the first section and a first end of the second section, the second rotary joint comprising a second gear unit, the second rotary joint defining a second axis of rotation;

a second motor aligned along the first axis of rotation;

means for coupling the second motor to the second rotary joint;

a third rotary joint at a second end of the second section, the third rotary joint defining a third axis of rotation;

a third motor;

means for coupling the third motor to the third rotary joint; and wherein the first and second motors are thermally insulated from the horizontally swinging arm.

* * * * *